United States Patent [19]
Hotz

[11] 4,021,991
[45] May 10, 1977

[54] FASTENING DEVICE

[76] Inventor: Roger W. Hotz, Ash Drive, Northford, Conn. 06472

[22] Filed: Mar. 15, 1976

[21] Appl. No.: 666,950

Related U.S. Application Data

[63] Continuation-in-part of Ser. No. 551,778, Feb. 21, 1975.

[52] U.S. Cl. .............................. 403/388; 403/409; 403/408; 403/387
[51] Int. Cl.² .......................................... F16B 7/18
[58] Field of Search .......... 403/188, 388, 409, 374, 403/254; 52/758 F, 758 R, 758 C, 758 D, 584, 235, 510, 645, 665

[56] References Cited
UNITED STATES PATENTS

| 1,821,182 | 9/1931 | Hoppes | 403/374 |
| 3,700,292 | 10/1972 | Owens | 52/758 F X |

FOREIGN PATENTS OR APPLICATIONS

| 1,036,336 | 7/1966 | United Kingdom | 52/758 F |

Primary Examiner—Wayne L. Shedd
Attorney, Agent, or Firm—St. Onge, Mayers, Steward & Reens

[57] ABSTRACT

A fastening device such as a nut for a bolt that is passed through a tapered slot in one member so that it can be adjusted along the slot relative to another member before the bolt is tightened. The nut is double-tapered so that when it is drawn into the matching slot it wedges against the sides of the slot and positively locks the bolt against movement.

22 Claims, 12 Drawing Figures

FASTENING DEVICE

This application is a continuation-in-part of application, Ser. No. 551,778 filed Feb. 21, 1975.

BACKGROUND OF THE INVENTION

The present invention relates to fastening devices for rigidly fastening one member in an adjusted position with respect to another, and it relates more particularly to means for locking such members rigidly together while allowing adjustment of the position of one of the members relative to the other prior to final tightening of the fastener.

There are numerous situations in which two members must be positioned relative to each other before they are rigidly, and in some cases permanently, locked together by means of a nut and bolt or similar fastening device. For example, in the construction of steel-frame buildings with masonry facings, it is common practice to provide continuous horizontal shelf angles at vertically spaced intervals up the walls, so that the brick wall or other masonry is supported by the steel framework. In such construction, erection of the steel framework precedes the masonry, with the masonry being brought up approximately to the level of the shelf angle where it is necessary to adjust the elevation of the shelf angle so that its horizontal leg will fall within the mortar joint between two courses of brick. Construction of the wall is then continued on top of the shelf angle. Additional shelf angles are provided as required by good engineering practice.

Due to inherent tolerances in the manufacture of steel framing, as well as in masonry construction, and due also to deflections that occur after the framework is erected, it is practically impossible to preset the shelf angles at their final locations until the wall is erected and structural loads are actually applied. Consequently, it is necessary to adjust the position of the shelf angle both vertically and horizontally with respect to a steel beam, or other structural member, to which it is attached, so that it is at the proper elevation relative to the brick courses above and below it.

Horizontal adjustment of the shelf angle is readily achieved simply by providing slots in a horizontal portion of one of the members so that the bolts can slide in the slots as the shelf angle is lined up with the brick wall. However, the use of vertical slots has not been considered satisfactory because of the necessity of locking the assembly against slippage due to gravity loads by means of a high-tensile bolt that requires the application of closely controlled tightening torque for generating sufficient friction between adjoining surfaces or by welding the assembly in its final position. Both these techniques require the use of specialized labor and equipment, which often are not at the site when the work is to be done. Furthermore, either of these prior techniques is time consuming and requires a high degree of quality control and inspection in order to ensure the desired results. Consequently, the typical installation relies on so-called "finger shims" which are slipped between the beam and the clips by which the shelf angle is attached. The shelf angle is thus raised or lowered by removing or inserting additional shims to achieve the desired elevation.

The use of such shims is very costly and time consuming due to the cost of the shims, the labor required to fit up and install them initially and the labor required to make the necessary adjustments in order to line up the shelf angle.

It is accordingly an object of the present invention not only to provide a simpler way to mount shelf angles on steel beam, but also to facilitate fastening any member rigidly to another while allowing for adjustment between such members prior to final locking of the assembly. Fastening means of the present invention are primarily intended for use in applications where the members to be fastened are normally subjected to external forces tending to shift them in one direction, the purpose of the invention being to positively lock such members together in such a way that friction between them is not relied upon to prevent slippage in that direction.

Summary of the Invention

Basically the invention resides in locking a tapered segment, such as a threaded nut, bolt head or the like, in a slot provided in one of two members to be joined. The walls of the slot converge lengthwise in order to positively block the movement of the segment in the direction in which an external load is applied. When the fastener is tightened, the tapered segment is forced into wedging engagement with the walls of the slot, thereby positively preventing movement toward the narrow end of the slot. Desirably the segment is a nut having a longitudinal axis and sides which taper at least in the direction of its axis. A bolt, or other locking means by which the members are fastened together, is held in a fixed position relative to the second member, so that as the bolt is tightened it draws the nut into rigid wedging engagement within the slot in the first member.

In addition to being tapered along the longitudinal axis, the sides or working surfaces of the nut should also converge in a direction transversely of the axis so that they match the slot into which nut fits. It has been found, however, that while the walls of the slot may be beveled to correspond to the taper of the nut along its longitudinal axis, it is desirable in a great many cases not to bevel the walls, but to apply enough torque in tightening the bolt to force the tapered nut into the walls of the slot in order to deform the sides of the slot, thereby providing surface-to-surface contact with the nut.

DETAILED DESCRIPTION OF PREFERRED EMBODIMENTS OF THE INVENTION

With the foregoing general information in mind, reference is made to the accompanying drawings which illustrate several embodiments of the invention as it may be employed in various applications, including the bolting of shelf angles to a structural member in a steel-frame building. In the drawings, FIG. 1 is a perspective view of a portion of a steel frame for a building in which the fastening means of the present invention may be employed in mounting shelf angles;

Figure 1:
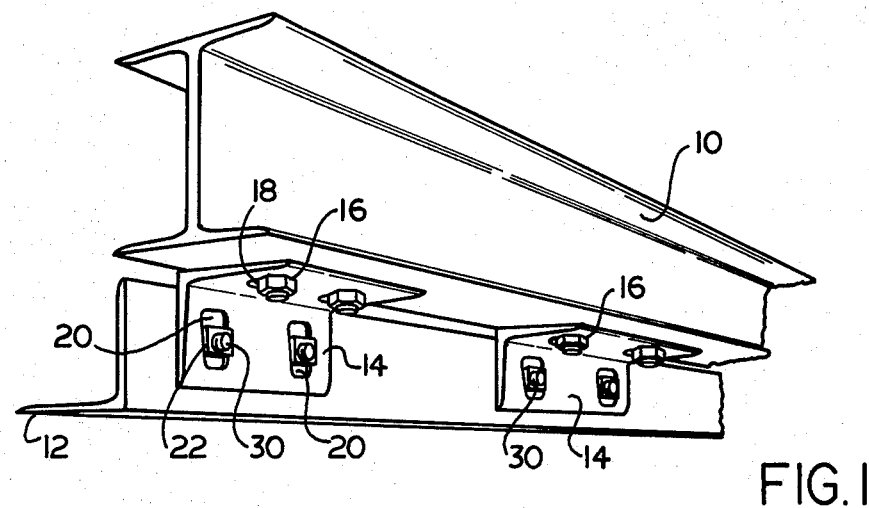

In the specific application for the fastening means of the present invention illustrated in FIGS. 1–6, an I-beam 10 is shown as a typical structural member in a steel-frame building, the outer brick wall (not shown) of which is built along the far side of beam 10 parallel therewith. A continuous shelf angle 12 is shown mounted on beam 10 using a plurality of short clip angles 14, each of which in this instance is bolted to the underside of the bottom flange of the beam 10 by means of a pair of bolts 16. The brick wall is normally built up until its top course reaches a level near shelf angle 12, which is then adjusted vertically and horizontally so that its horizontal leg is located between the courses of brick immediately above and below it.

Each clip angle 14 is provided in its horizontal leg with a pair of elongated slots 18, through which bolts 16 extend so that the shelf angle 12 can be aligned horizontally with the wall. Heretofore vertical adjustment between the shelf angle and the beam has usually been accomplished by inserting shims of the required thickness between the horizontal legs of the clip angles and the bottom leg of the I-beam in order to take up any space between these members before the bolts are tightened. It is of course essential that this shimming be done with care in order to ensure that the shelf angle is in contact with the brick course below it. Accordingly, considerable time and tedious efforts are required in shimming.

However, in accordance with the present invention, shimming is eliminated entirely by providing each clip angle 14 with a pair of vertically elongated slots 20, the walls 21 of each of which converge inwardly toward its lower end. The invention further contemplates the provision of special nuts, each of which has sides or working surfaces 24 and 26 that taper both in the direction of the longitudinal axis of its threaded bore 28 and transversely thereof. A headed bolt 30 is then threaded into each nut 22 through a hole 32 (FIG. 2) drilled or punched in the shelf angle 12 so that each nut 22 is drawn against the converging side walls 21 of its slot 20. Nuts 22 therefore become rigidly wedged within the slots 20, positively preventing downward movement of bolt 30 in the slot. It will be apparent moreover that the only possible slippage that can occur between the shelf angle 12 and clips 14 is that resulting from actual deformation of the working surfaces 24 and 26 on nuts 22 or of the walls 21 of slots 20. In contrast, if uniform slots were used with conventional nuts and bolts, slippage can be prevented only by the friction between the adjoining surfaces when the vertical legs of the shelf angle and clip are drawn together by the bolts.

Tapered nuts 22 each have oppositely disposed narrow and wide ends or faces between which the working surfaces 24 and 26 extend, the distance between the working surfaces at the narrow end being less than the space between the walls 21 at the narrow end of slot 20, thereby permitting the end of the nut 22 to be partially inserted into the slot at the small end so that it can engage within the slot.

In using the fastening means of the present invention, the shelf-angle 12 will usually be pre-assembled on the beam 10 in accordance with usual practice. After the beam is in place and during construction of the masonry wall, the bolts 16 are loosened enough to permit the shelf angle to be adjusted horizontally into alignment with the wall before being retightened. With the angle 12 adjusted horizontally bolts 30 are loosened, the shelf angle brought up to its proper height, and the bolts retightened, drawing the nuts 22 into wedging engagement with the walls 21 of the slots 20, thereby preventing displacement of the shelf angle relative to the clip angle 14.

Figure 7:
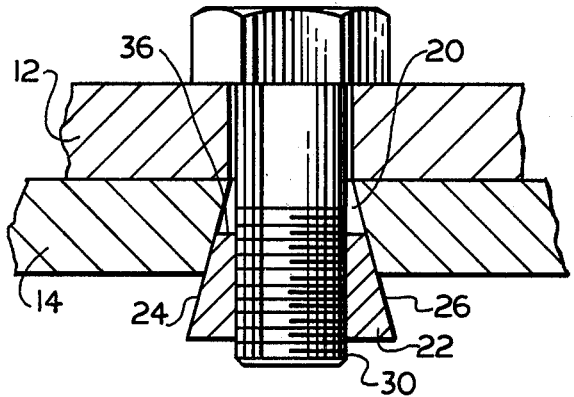
FIG. 7 is view similar to FIG. 6 but showing the walls of the slot beveled to exactly match the shape of the nut.

In order to obtain surface engagement between the sides of each nut 22 and the walls 21 of the slot without deforming the edges of the slot, the walls 21 can be beveled as shown in FIG. 7 in a direction normal to the plane of the slot so that they are parallel to the working surfaces 24 and 26 of nut 22. However, it has been found that it is not necessary to bevel the walls of the slot in this manner, but that they can be made substantially parallel to each other and perpendicular to the plane of the slot. The nut 22 is then drawn into the slot with sufficient force to deform the walls 21 adjacent the outer side of clip angle 14. In this way the nut makes its own bevel in the slot at the point of engagement, and surface-to-surface contact is thereby achieved between the nut and slot.

Accordingly, one aspect of the present invention resides in a method of rigidly locking together two components of a fastening system which includes the steps of inserting a tapered hardened steel segment small end first into an elongated slot in another component of the system, such as the hereinbefore described clip angle, and then forcing the tapered surfaces of the segment into the walls of the slot in order to provide surface-to-surface contact between the tapered surfaces of the segment and the walls of the slot.

Figure 8:
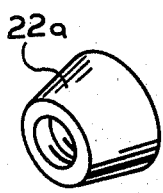
FIG. 8 is a perspective view of a conical nut which may be employed.
Figure 2:
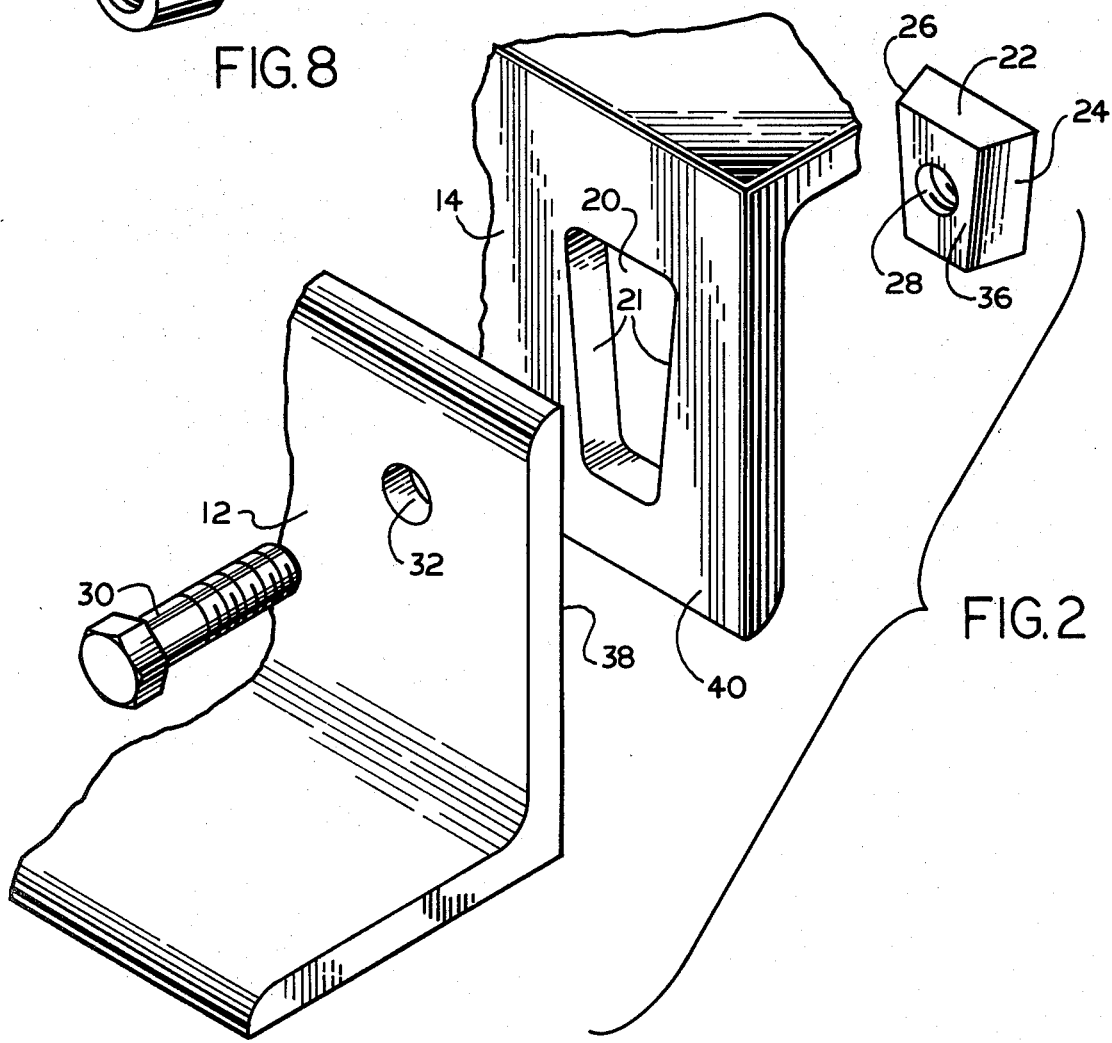
FIG. 2 is an enlarged exploded perspective view of the fastening means shown in FIG. 1.
Figure 3:
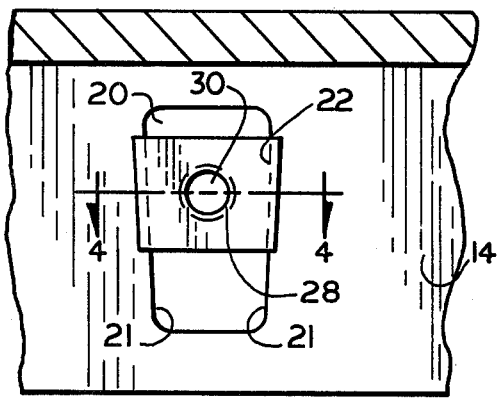
FIG. 3 is an end view of the fastening means of FIGS. 1 and 2 as seen from the nut end of the assembly with the nut and bolt disposed at one limit of adjustment in the vertical slot.
Figure 4:
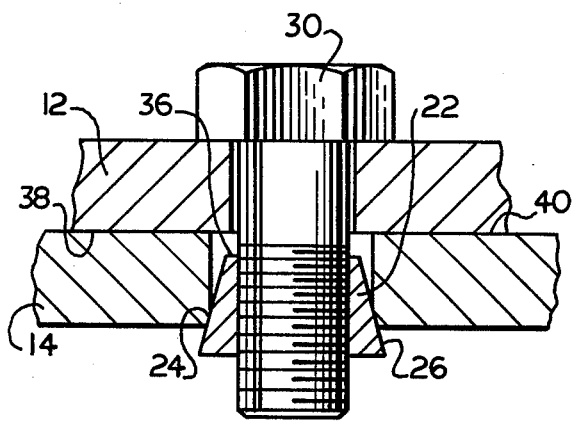
FIG. 4 is an enlarged section through the locking bolt taken on the line 4—4 of FIG. 3.

Referring in greater detail to FIGS. 3 and 4, it will be noted that nut 22 is trapezoidal in configuration with its sides 24 and 26 lying in planes which converge both axially of the bolt 30 and transversely of it. Thus, convergence of sides 24 and 26 axially of bolt 30 as shown in FIG. 4 causes the nut 22 to wedge against the walls 21 of the slot as the nut is drawn axially into the slot by bolt 30. In some applications the nut may be tapered only along the longitudinal axis of the bolt, in which case the working surfaces of the nut may be simply frusto-conically shaped, as shown in FIG. 8, or the sides 24 and 26 of nut 22 could converge only in an axial direction. However, convergence of the sides 24 and 26 to match the angle at which the side walls 21 of slot 20 converge in the plane of the slot as shown in FIG. 3 provides greater assurance against deformation of the nut under load.

Figure 5:
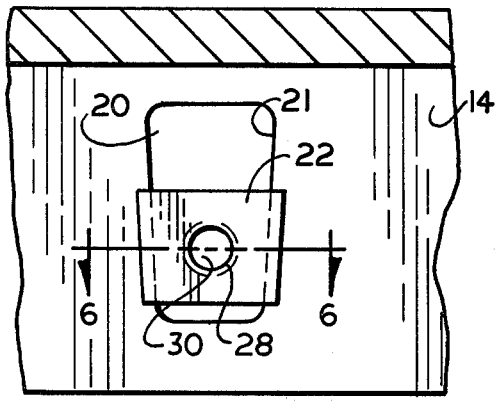
FIG. 5 is a view similar to FIG. 3, but showing the nut and bolt disposed at the opposite limit of adjustment.
Figure 6:
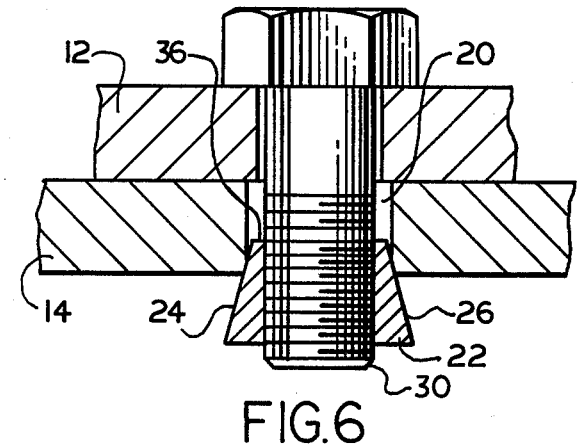
FIG. 6 is an enlarged section through the locking bolt taken on the line 6—6 of FIG. 5.

It will also be noted that if the nut 22 is located near the top or wide end of slot 20 when the shelf angle 12 is aligned vertically with the wall, it will be drawn deeper into the slot, as illustrated in FIG. 4 than when it is located at the bottom or narrow end of the slot as shown in FIGS. 5 and 6. In this connection it will be apparent that within the limits of adjustment allowed by slot 20, as represented by the showing in FIGS. 3 and 4, where the nut 22 is located near its uppermost position, and by the showing in FIGS. 5 and 6, where it is located at its lowest position, the inner end 36 of nut 22 must not be drawn into engagement with the near side 38 of the vertical leg of shelf angle 12. If this were to happen, the nut 22 could not be drawn into engagement with the side walls 21 of slot 20 without recessing the surface of the shelf angle around the hole 32 to permit the end of the nut to project beyond the surface 40 of the clip angle. It is therefore important to coordinate the slope of the sides 24 and 26 of the nut both axially and transversely of the bolt 30 with the amount of vertical adjustment to be provided and with the depth of the slot 20. It will likewise be noted that since the sides 24 and 26 of nut 22 must be in wedging engagement within slot 20 at every point along its length, the minimum width of the inner end 36 of nut 22 must be less than the width of slot 20 at its narrow end. On the other hand, in order to prevent the nut 22 from being drawn completely through slot 20, the width of the slot at its wide end must be narrower than the width of the nut at its wide end.

Thus, since the tangent of the slope measured transversely of the longitudinal axis of the bolt is proportional to the amount of adjustment along the length of the slot 20, and since the tangent of the slope measured axially of the bolt is proportional to the depth to which the nut can be inserted into the slot, the relationship of these four variables may be expressed by the following equation:

$$\frac{\tan a}{\tan b} = \frac{d}{h}$$

where
- $a$ is the slope of the working surfaces of the nut measured transversely of the bolt,
- $b$ is the slope of the working surfaces of the nut measured axially of the bolt,
- $h$ is the vertical adjustment obtainable along the slot and
- $d$ is the depth to which the nut must be allowed to penetrate, which for practical purposes is the minimum effective thickness of the material in which the tapered slot is formed.

It will be apparent from this equation that the slopes of the working surfaces 24 and 26 of the nut in both directions can be readily selected for any given thickness $d$ of the material in which the slot 20 is provided and a given maximum vertical adjustment $h$. Or given an existing nut 22 with predetermined slopes of its working sides and knowing the amount of vertical adjustment that may be required, the thickness of the clip angle 14 can be easily determined. It should also be noted that in order to allow for deformation of the walls of the slot when the nut is driven into the slot with sufficient force to swage itself into surface-to-surface engagement, the total depth or thickness of the slot walls must be enough to take this additional movement into consideration.

Figure 9:
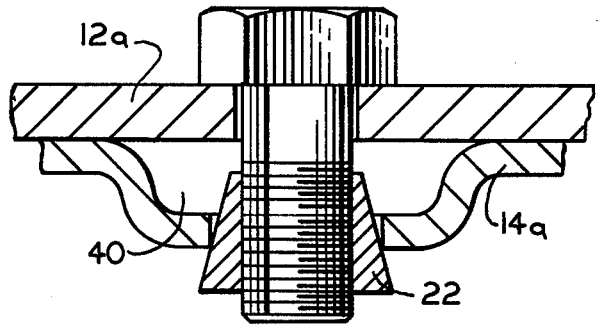
FIG. 9 is an enlarged cross-sectional view similar to FIGS. 4 or 6 of a fastener in accordance with the present invention in which light-gauge metal is employed.
Figure 10:
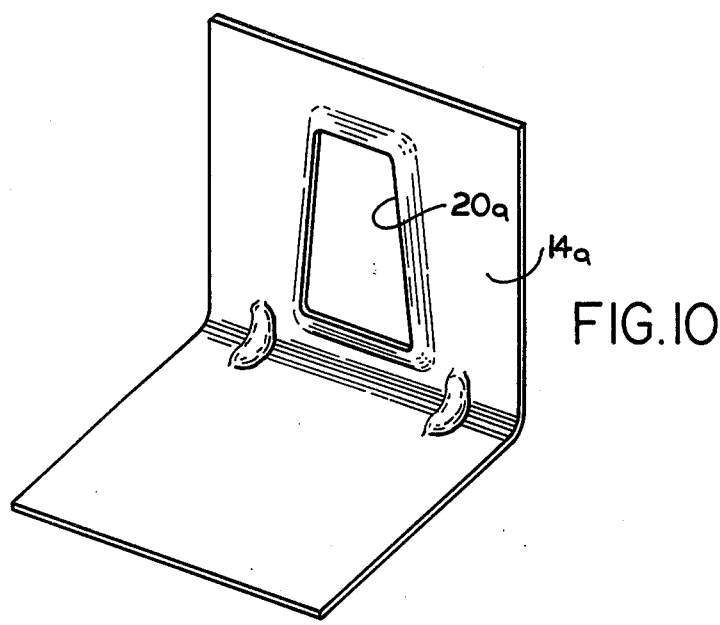
FIG. 10 is a perspective view of the slotted member shown in FIG. 9.

While the foregoing description of the invention refers specifically to one application thereof, it is apparent that the invention can be employed in many situations, including belt-adjusting systems for power transmissions and the like. For example, as will be seen in FIGS. 9 and 10, the slotted member 14a may be made of light-guage material, such as sheet metal, by forming an elongated depression 40 around the slot 20a at the same time that the slot is punched, so that the slot is actually spaced from the plane along which the members 12a and 14a are joined. The nut 22 is then wedged into the slot 20a by means of bolt 30 in the same manner as for the heavy-guage material illustrated in FIG. 1–6. It will be noted that formation of the depression 40 in the light-gauge member 14a, not only provides the depth or effective thickness required to let the nut 22 be drawn into locking position, but also strengthens the material around the slot, so that the bolt can be turned up tighter without bending the material on either side of the slot.

Figure 11:
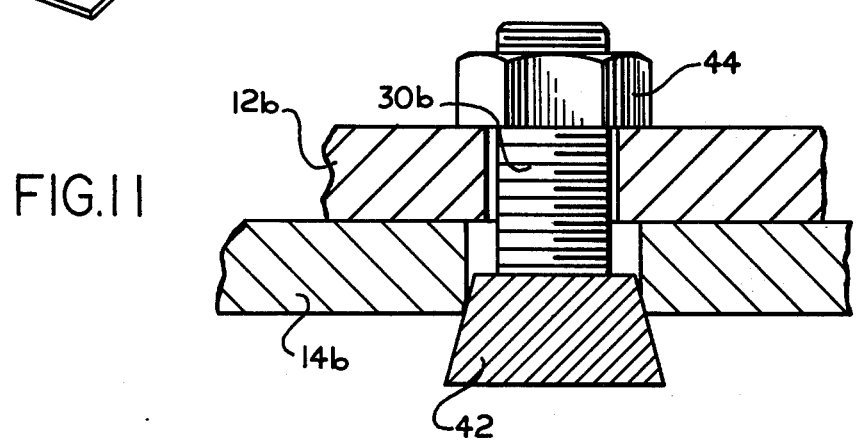
FIG. 11 is a view similar to FIGS. 4 or 6 of another embodiment of the invention.

Likewise, when the loads on the two members to be joined are relatively light, the tapered segment may be a conical nut 22a as illustrated in FIG. 8. In still another form of the invention, the tapered segment may consist of the head 42 of a bolt 30b (FIG. 11), the bolt-head 42 being so shaped that it fits within the elongated slot in the member 14b in the same way that the nut 22 is received within the vertical slot 20. Where such a special headed bolt is provided, a conventional hexagonal nut 44 can be used to draw the head 42 of the bolt into wedging engagement with the slot.

Figure 12:
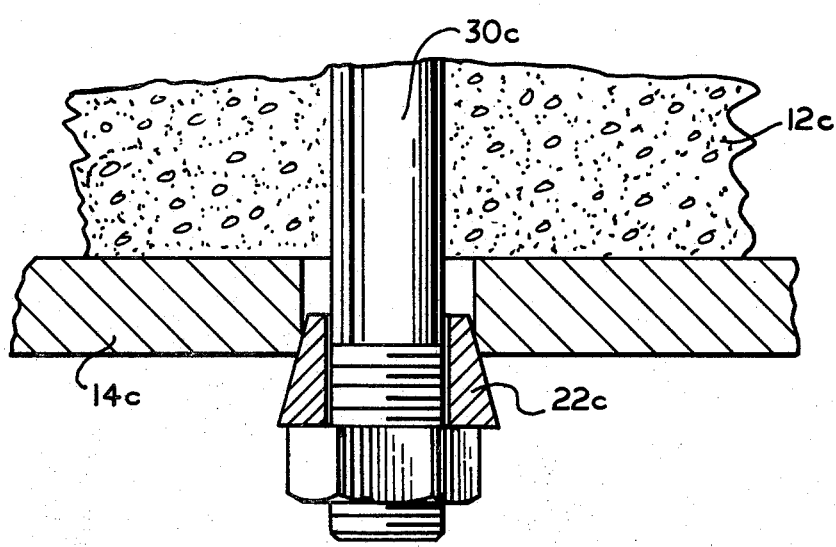
FIG. 12 is a view similar to FIG. 11 of still another embodiment of the invention.

On the other hand, as illustrated in FIG. 12, the tapered segment may consist of an insert 22c, which is similar in configuration to the nut 22 but has a plain bore through which a stud 30c extends with a conventional nut threaded to the outer end of the stud for forcing the insert 22c into engagement with the walls of the slot. In this instance the member in which the stud 30c is fixed is a concrete wall, the stud being immovably embedded or otherwise rigidly mounted in the concrete.

What is claimed is:
1. Fastening means for rigidly locking a first member relative to a second member wherein said members are provided with surfaces of engagement permitting adjustment relative to each other, said members being normally subjected to external forces tending to shift them relative to each other in one direction, said fastening means comprising in combination
  - a tapered segment having oppositely disposed faces, a longitudinal axis intersecting said faces and working surfaces intermediate said faces extending generally in the direction of said longitudinal axis, said working surfaces being tapered along said axis toward one of said face, such that said segment at said one face is narrower than at the other,
  - said first member having an elongated slot in its said engagement surface with longitudinal walls spaced to receive said segment such that said working surfaces of said segment engage said walls of said slot, said slot extending generally parallel to said one direction in which said members tend to shift, said longitudinal walls of said slot converging in said one direction at a predetermined angle, and
  - locking means fixedly supported by said second member and adapted and arranged to force said working surfaces of said segment into wedging engagement within said slot at an adjusted position along the length thereof in order to positively lock said members together at such adjusted position.

2. Fastening means as defined in claim 1, wherein said segment is trapezoidal in configuration and has a pair of said working surfaces disposed opposite each other and inclined inwardly toward each other transversely of said axis at an angle substantially equal to the angle between the walls of said slot.

3. Fastening means as defined in claim 2, wherein said segment is a nut having a threaded bore extending parallel to said axis, said locking means comprising a bolt threaded into said nut.

4. Fastening means as defined in claim 3, wherein said longitudinal walls of said slot in said first member are also inclined relative to each other in the direction of said axis at an angle substantially equal to the angle at which said working surfaces of said nut converge in such axial direction in order to provide surface engagement between said working surfaces of said nut and said longitudinal walls of said slot.

5. Fastening means as defined in claim 2, wherein said longitudinal walls of said slot are also inclined relative to each other in the direction of said axis at an angle substantially equal to the angle at which said working surfaces of said segment converge in such axial direction in order to provide surface engagement of said segment in said slot.

6. Fastening means as defined in claim 1, wherein said segment is a frustro-conical member, the axis of which coincides with said longitudinal axis.

7. Fastening means as defined in claim 2, wherein the relationship between the slopes of said working surfaces with and transversely of said longitudinal axis, the amount of adjustment along said slot and the minimum effective thickness of the walls of said slot measured parallel to said axis is defined by the equation $$\frac{\tan a}{\tan b} = \frac{d}{h}$$

where $a$ is the slope of said working surfaces measured transversely of said longitudinal axis, $b$ is the slope of said working surfaces measured parallel to said longitudinal axis, $h$ is the amount of adjustment obtainable along said slot and $d$ is the minimum effective thickness of the walls of said slot.

8. Fastening means is defined in claim 1, wherein said locking means comprises a bolt and a nut threaded thereto with the head of said bolt comprising said tapered segment, said bolt extending through said slot in said first member and then through a hole in said second member with said nut threaded to the end of said bolt for drawing the head of said bolt into wedging engagement within said slot.

9. Fastening means as defined in claim 1, wherein said tapered segment is formed with a smooth bore extending parallel to said longitudinal axis.

10. Fastening means as defined in claim 1, wherein said slotted member is formed of light-gauge metal with an elongated depression in which said slot is disposed such that the walls of said slot are spaced from said surfaces of engagement in order to permit said tapered segment to be drawn into locking engagement with the walls of said slot.

11. In fastening means as defined in claim 1, the component thereof which comprises said slotted member, wherein the width of said slot at its narrow end is wider than said tapered segment at its said one face and the width of said slot at its wide end is narrower than the width of said segment at its other face.

12. The component defined in claim 11, wherein the walls of said slot are substantially parallel to said working surfaces of said segment.

13. In fastening means as defined in claim 1, a trapezoidal tapered segment having a pair of oppositely disposed working surfaces inclined inwardly toward each other transversely of said longitudinal axis at an angle substantially equal to said angle between the walls of said slot.

14. A tapered segment as defined in claim 13 which comprises a threaded nut.

15. A tapered segment as defined in claim 13, wherein said segment is formed with a smooth bore extending parallel to said longitudinal axis.

16. A tapered segment as defined in claim 13 wherein said segment is provided with a threaded shank extending along said longitudinal axis to form a bolt with said segment forming the head of said bolt.

17. A nut for use in connection with a component of a fastening system having a longitudinally tapered slot, said nut having oppositely disposed faces and a pair of oppositely disposed side walls intermediate said faces with a threaded bore intersecting at least one of said faces and defining the longitudinal axis of said nut, said side walls lying in planes that converge both along said axis in the direction of said one face and transversely thereof to form a trapezoidal body for insertion into said tapered slot in said component with its longitudinal axis disposed substantially normal to the opening of the slot and with the convergence of said side walls transversely of said axis coinciding with the taper of said slot for engagement of said side walls therewith such that said nut is adjustable lengthwise of said slot prior to being rigidly wedged into said slot by a locking member threaded into said nut.

18. A fastening element for rigidly locking two members in an adjusted position in which said members are normally subjected to external forces tending to shift them relative to each other in one direction and including an elongated slot in at least one of said members for permitting adjustment of said members relative to each other prior to being locked together, the longitudinal walls of said slot converging toward each other in said one direction at a predetermined angle, said element comprising a trapezoidal segment having oppositely disposed faces, a longitudinal axis intersecting said faces and a pair of oppositely disposed side walls intermediate said faces extending generally in the direction of said longitudinal axis, said side walls being tapered along said axis in the direction of one of said faces and also converging transversely of said axis at an angle substantially equal to said angle between the walls of said slot, said segment being adapted and arranged for insertion into said slot with the convergence of said side walls transversely of said axis matching said slot for engagement of said side walls therewith, such that when said segment is forced axially into said slot, said side walls are driven into wedging engagement with the walls of said slot at a desired position along said slot.

19. A fastening element as defined in claim 18, wherein said trapezoidal segment is provided with a smooth bore defining said longitudinal axis.

20. A fastening element as defined in claim 18, which comprises a nut having a threaded bore defining said longitudinal axis.

21. Fastening means as defined in claim 1, wherein said segment is a nut having a threaded bore extending parallel to said axis, said locking means comprising a bolt threaded into said nut.

22. Fastening means as defined in claim 1, wherein said segment is hardened steel and the walls of said slot are parallel to each other in the direction of said longitudinal axis, whereby said tapered working surfaces are forced by said locking means into surface-to-surface contact with the walls of said slot.

* * * * *